United States Patent [19]

Gretz

[11] Patent Number: 5,442,141
[45] Date of Patent: Aug. 15, 1995

[54] EASY-INSERTION INTEGRALLY HINGED C-SHAPED CONNECTOR

[75] Inventor: Thomas J. Gretz, Clarks Summit, Pa.

[73] Assignee: Arlington Industries, Inc., Scranton, Pa.

[21] Appl. No.: 55,734

[22] Filed: Apr. 30, 1993

[51] Int. Cl.⁶ ............................................. H02G 3/22
[52] U.S. Cl. ............................ 174/153 G; 174/65 G; 174/152 G; 248/56
[58] Field of Search ............ 174/153 G, 152 G, 65 G; 439/460, 464, 606; 248/56

[56] References Cited

U.S. PATENT DOCUMENTS

| | | | |
|---|---|---|---|
| 2,225,472 | 12/1940 | Franklin | 174/153 G X |
| 3,562,847 | 2/1971 | Jemison | 174/153 G X |
| 3,967,050 | 6/1976 | Makihara et al. | 248/56 X |
| 4,192,477 | 3/1980 | Decky et al. | 248/56 |
| 4,299,363 | 11/1981 | Datschefski | 248/56 |
| 4,640,479 | 2/1987 | Shely et al. | 248/56 |
| 5,315,684 | 5/1994 | Szegda | 385/139 |

Primary Examiner—Leo P. Picard
Assistant Examiner—Paramita Ghosh

[57] ABSTRACT

This invention relates to electrical connectors, specifically to an electrical connector that is easy to insert into a hole or knock-out of an electrical junction box. Design of the connector provides for positive fixture of the connector in the box once non-metallic sheathed cable, either oval or circular in cross-directional shape, is inserted through the connector, thus preventing the cable from being withdrawn. The C-shaped one piece connector of this disclosure contains an integral hinge, a cutout area, and a necked down area on the top flange to provide for easy flexing about the central insertion axis and therefore easy insertion into an electrical junction box. The jaws of the electrical connector are designed such that a positive bite or grip is applied to an oval or circular non-metallic sheathed cable as tension is applied on said cable to attempt to remove it from said electrical enclosure.

5 Claims, 5 Drawing Sheets

EASY-INSERTION INTEGRALLY HINGED C-SHAPED CONNECTOR

FIELD OF THE INVENTION

This invention relates to electrical connectors, specifically to an electrical connector that is easy to insert into a hole or knock-out in an electrical junction box. Typically, force must be applied to existing commercially available electrical connectors, sometimes involving the use of a hammer or screwdriver, to insert the connector into a junction box. This particular invention relates to an improved C-shaped connector that contains an integral hinge to facilitate easy flexing of the connector, thereby effectively reducing the outside diameter of the connector and allowing easy insertion into a hole or knock-out of a typical junction box.

BACKGROUND OF THE INVENTION

Typically, non-metallic sheathed cable is attached to electrical junction boxes by either of two general methods. The classical method of connecting said non-metallic sheathed cable to an electrical junction box is by inserting a circular, threaded metal connector through a hole or knock-out in the junction box, mating the exposed end of the connector inside the box with a threaded flange, tightening the threaded flange against the connector and thus tightly to the wall of the junction box, inserting said non-metallic sheathed cable, orienting said cable in the proper orientation if it is an oval cross-directional shape, and then tightening two screws that draw together a bracket that is an integral part of said connector causing the bracket to draw together around said cable and lock it in place.

The second general method of attaching non-metallic sheathed cable, either circular or oval in cross-directional shape, employs quick connect type fittings that are pushed into the hole in the junction box either prior to the insertion of said cable or are inserted after being affixed onto the cable with the connector and cable then inserted together.

U.S. Design Pat. No. 251,781 shows a quick connect electrical connector that has a cutout area in its circumference as does the invention of this disclosure. This connector is difficult to use because it is hard to squeeze to a sufficiently small circumference to allow easy insertion in the hole or knock-out of an electrical junction box. The hinge and notched area of the top flange of this invention, which is an improvement to D-251,781, enable far easier insertion in a junction box with gentle pressure applied with one hand.

The connector of U.S. Pat. No. 4,299,363 consists of four equally sized tabs for gripping the wall of a junction box. Enough force must be exerted to overcome the resistance provided by the four tabs. There is no hinge in the outer perimeter of the connector, no necked down area to assist in the flexing of the connector and it is mentioned in '363 that insertion in the hole of a junction box "may be facilitated when necessary by a light tapping action" on the side of the connector "with a hammer where the sizing of the knock-out opening is somewhat smaller than will accomodate finger pressure application of the connector to the box knock-out opening".

U.S. Pat. Nos. 4,919,370 and 5,118,057 refer to connectors that are substantially different than the connector of this disclosure, being designed to be installed partially into a knock-out of a junction box prior to inserting the cable, and then installed completely once the cable has been inserted. There are many more steps involved than the simple finger pressure assisted installation of this invention. Both 4,919,370 and 5,118,057 mention that the external portion of the fitting may be adapted to provide a "rear-end striking surface" in one variation, another variation with "rearward facing screwdriver slots" to enable driving the fitting securely into the box with a screwdriver, and another variation in which the fitting may be affixed to the panel and locked by compression of gripping arms by an "ordinary pair of channelled adjustable pliers".

This disclosure thus improves all of the aforementioned prior art by providing a simple, one-piece moldable electrical connector that is flexible enough in its design to allow easy one hand insertion in the knock-out of a junction box while also providing one-way restraint of the cable at the junction box wall to prevent forceful removal therefrom.

SUMMARY OF THE INVENTION

This invention relates to electrical connectors, specifically to an electrical connector that is easy to insert in a hole or knock-out of an electrical junction box. The connector can easily be inserted with one hand by applying a slight squeezing pressure to the outer diameter of the connector. The features of the connector that allow it to easily enter the junction box hole are the flexible material of construction, a cutout area in the outer circumference of the connector to make it a C-shaped body, an integral hinge that is spaced at such an angle from said cutout to allow easy collapsing of the outer diameter of the connector, and a cut-out area on the top flange.

Once the connector of this disclosure is inserted into the junction box and finger pressure is released, the connector springs back or nearly back to its original diameter, thereby holding the connector in the box. Non-metallic sheathed cable, either circular or oval in cross-sectional shape, can then be inserted through the connector to the desired amount. The connector contains jaws that are designed such that a positive yet non-abrasive bite or grip is applied on said cable when tension is applied to it in an attempt to remove it from said enclosure. Once inserted, the cable is therefore restrained by the connector and is held firmly in the junction box.

OBJECTS AND ADVANTAGES

Accordingly, several objects and advantages of this invention are:

(1) to provide a one-piece C-shaped electrical connector that is easy to insert in a hole or knock-out of an electrical junction box.

(2) to provide a connector that easily centers itself in the hole of a junction box.

(3) to provide a connector that is flexible enough to be easily reduced in outer diameter by a gentle squeezing pressure applied with one hand, allowing the connector to easily slip into the hole and then stay there once pressure is released.

(4) to provide a connector that applies a firm yet non-abrasive bite or grip on the heretofore inserted cable, so that the cable is thereby restrained when tension is applied on the cable in an attempt to pull it out of the junction box.

DESCRIPTION OF THE INVENTION

The figures are intended to illustrate a typical example of a preferred embodiment of this invention, an easy insertion connector for connecting non-metallic sheathed cable to electrical junction boxes.

Figure 1:
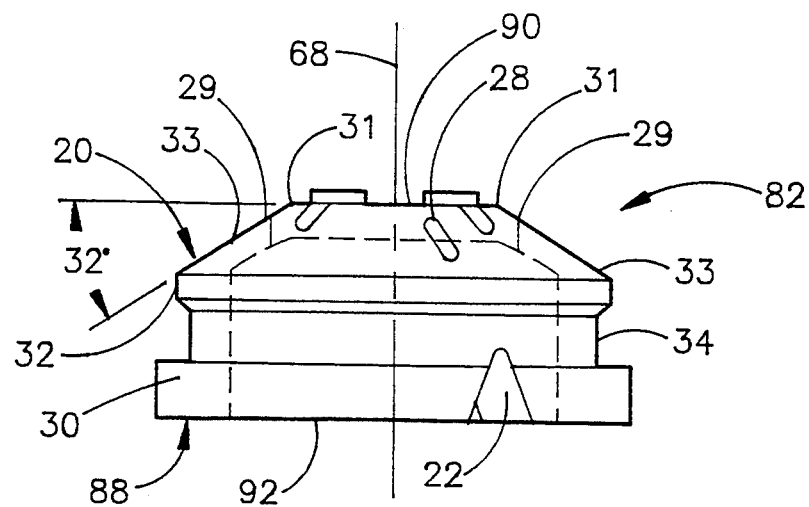
FIG. 1 is a side view of the easy-insertion connector of this invention showing the notch.

The connector of this invention, indicated by reference numeral 20 in FIG. 1, is a one-piece C-shaped connector having a hollow body of resilient flexible material with an outboard end 92 and an inboard end 90 with a passageway therethrough. The connector has two gripper jaws 24 that are spaced equidistant around central axis 68 with an outer conical surface 82 sloped typically 32° from a plane perpendicular to central axis 68, the arrangement and design of which provide easy centering of said connector 20 in an appropriate knock-out in an electrical junction box.

Ease of insertion of the connector 20 in an appropriately sized knock-out is facilitated in part by a notch 22 which is depicted in the body of connector 20 in FIG. 1. The notch 22 is V-shaped and extends through the base flange 30 of said connector 20 and partly into the seat 34. The seat is the portion of connector 20 that will be in intimate contact with the wall or panel of a junction box when connector 20 is affixed thereto. The base flange 30 has a diameter greater than the opening in the panel and is formed of two arcuate parts 94 and 96 with each part having a first facing end 98 and a second facing end 100.

Figure 2:
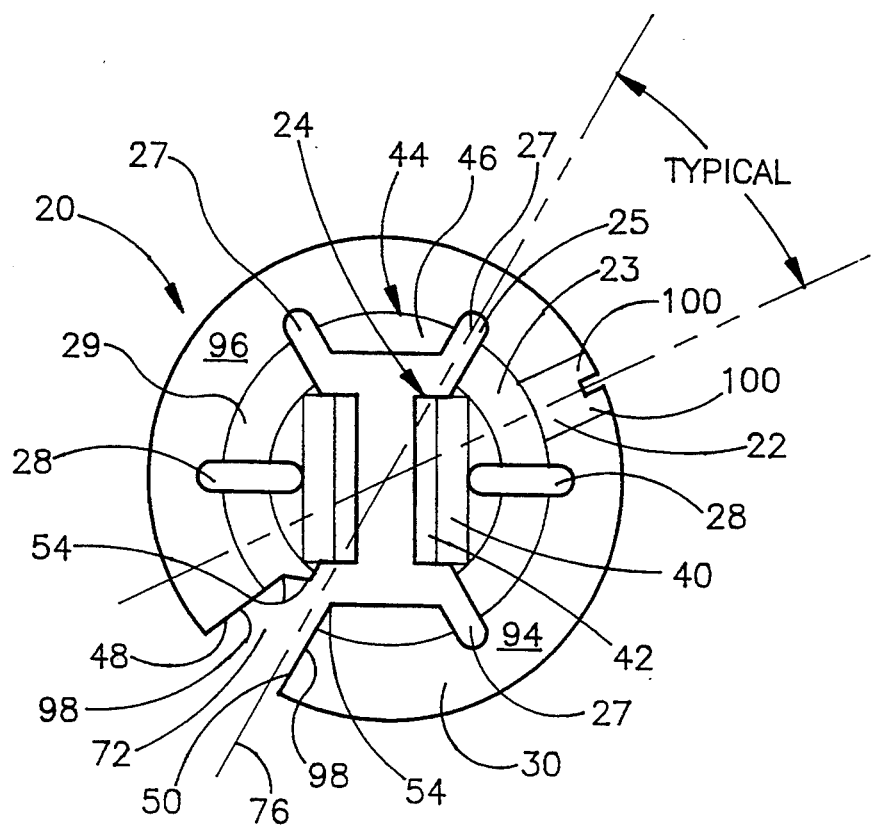
FIG. 2 is the end view of the invention from the enlarged end, or in relationship to FIG. 1 is a view from the lower end of FIG. 1 looking up.
Figure 8:
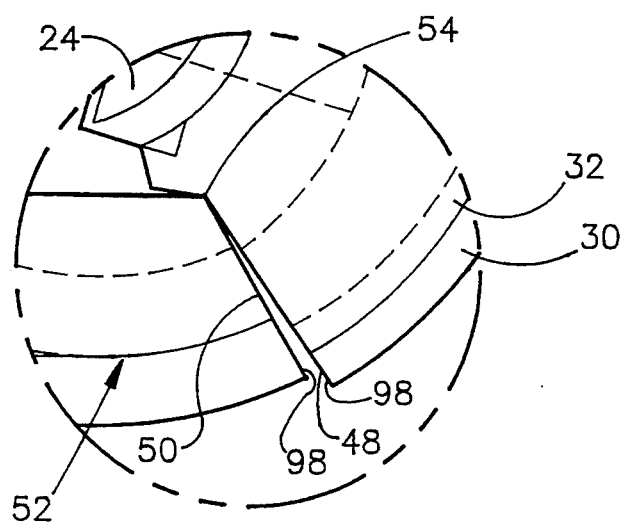
FIG. 8 is an enlarged view of a portion of FIG. 4, showing the collapsed portion of the connector as it is collapsed for insertion into a hole or knock-out of a junction box.
Figure 9:
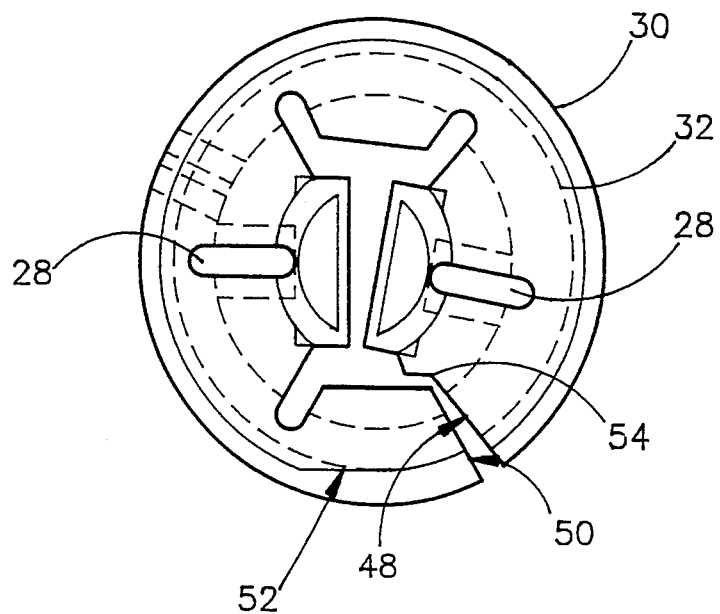
FIG. 9 is a view similar to FIG. 8, showing the collapsed position of the connector as it is collapsed for insertion into a hole or knock-out of a junction box.

The notch 22 works in conjunction with a second feature of the connector of this disclosure which is the cutout 72 depicted in FIG. 2. This drawing, showing the connector 20 from the enlarged end or the end that will be outside or outboard the junction box once it is applied thereto, depicts the notch 22 in its spatial relationship to cutout 72. The combined action of the notch 22 and cutout 72 creates a hinge 23 to enable easy flexing of connector 20, causing the opposing edges of the cutout to close together. The hinge 23 is an area in the wall of the connector between the bottom of notch 22 and the outer end 25 of the nearest of the three openings 27 which is the path of least bending resistance. The opposing edges of said cutout 72 are formed with a straight edge 50 and an angled edge 48, allowing the opposed surfaces to close together without structurally weakening said connector 20. As shown in FIG. 8, straight edge 50 will close until contacting angled edge 48 until they contact at mating point 54. By having angled edge 48, the connector is thus prevented from over collapsing or collapsing too far as pressure is applied to its outer circumference. This feature, closing to mating point 54, prevents the connector from closing too far and thus collapsing the outer diameter farther than required.

Figure 4:
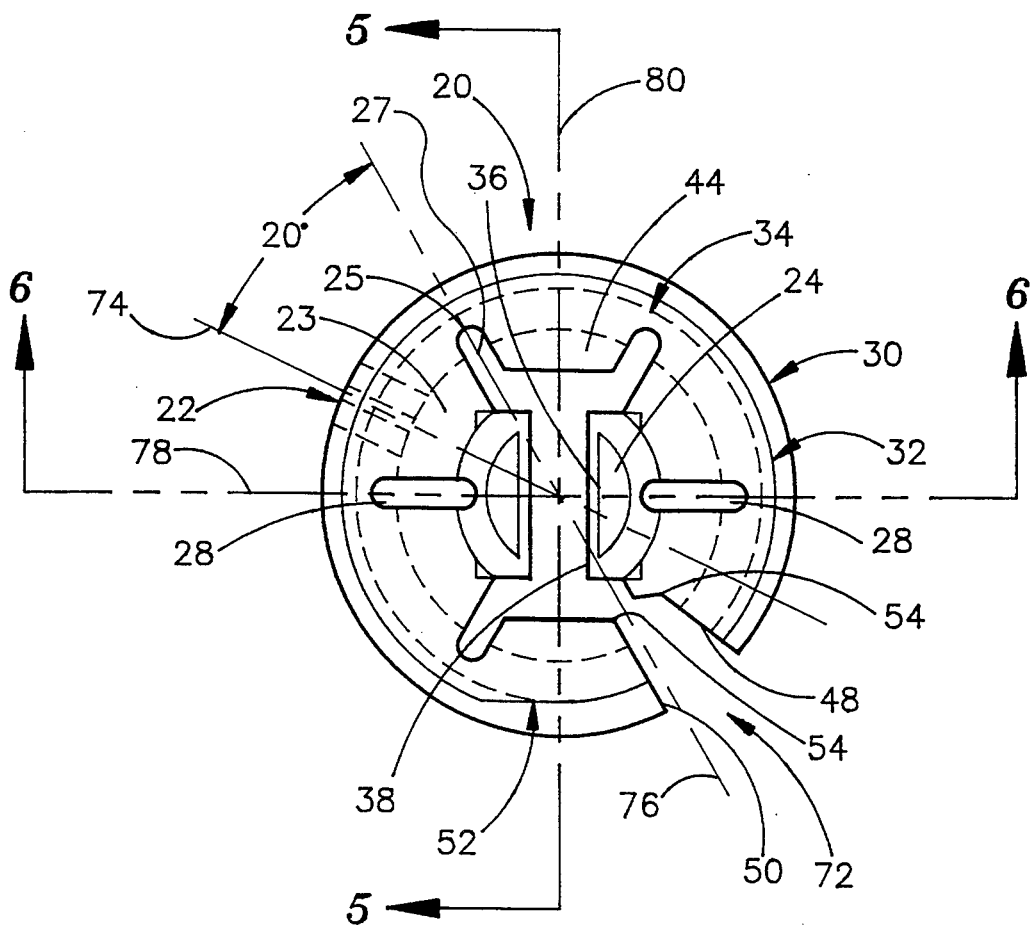
FIG. 4 is and end view of the invention from the insertion end of said invention.

The design of the cutout 72 allows an effective reduction in the outer diameter of the connector 20 along plane 78 as shown in FIG. 2. The beneficial effects of this reduction in outer diameter can best be explained by referring to FIG. 4, which is an end view of the invention from the insertion end of said invention. Collapsing the connector 20 causes a reduction of the outer diameter defined by the edge of the top flange 32 such that the effective diameter is reduced along the plane 78 centered through the slots 28 in the gripper jaws 24 effectively from ⅞ to 13/16 inch. As shown in FIG. 4, notch 22 is located on the opposite side of connector 20 and is spaced typically 20° apart from the plane that bisects cutout 72. This is depicted on the drawing by the angle between plane 74 which bisects notch 22 and plane 76 which bisects cutout 72. The notch 22 and hinge 23 are in the opposite half of the hollow one piece C-shaped round body from the cutout 72.

The notch 22 also works in conjunction with a third feature of the connector 20 of this disclosure which is the necked down area 52 of top or second flange 32 as shown in FIG. 4. As finger pressure is applied to the outer circumference of connector 20, the effective diameter of the top flange 32 is reduced along plane 80 typically from ⅞ to 13/16 inch. Hinge 23 typically becomes the pivot point about which the surrounding connector 20 collapses. The necked down area 52 of top flange 32 and the pivot action around hinge 23 are valuable in reducing the outside diameter of top flange 32 along both plane 78 and plane 80. This combined two-directional collapsing of the outer diameter of top flange 32 enables the easy insertion of connector 20 into the knock-out of an electrical junction box. The standard size knock-out for a connector of the dimensions described here is approximately 27/32 inch in diameter.

Figure 3:
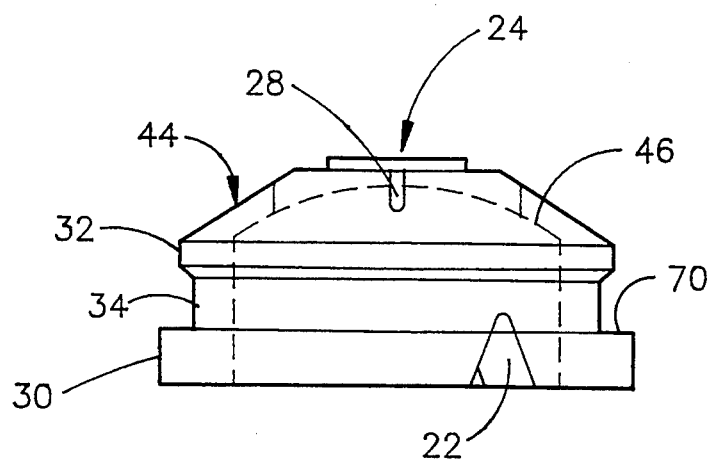
FIG. 3 is a side view of FIG. 2.

The gripper jaws 24, as depicted in FIG. 3, are each supported by an angled support 29 having an inboard end 31 and an outboard end 33. Each angled support 29 contains a slot 28 that adds flexibility to the gripper jaw 24 and angled support 29 when a cable is being inserted through the connector 20. The slot allows the gripper jaw 24 to flex outwardly to accomodate the cable, while still allowing enough stiffness for gripper jaw 24 to apply a strong restraining grip when tension is applied in an attempt to remove said cable from said junction box. The angle of the support 29 is formed as part of the outer conical surface 82.

Figure 6:
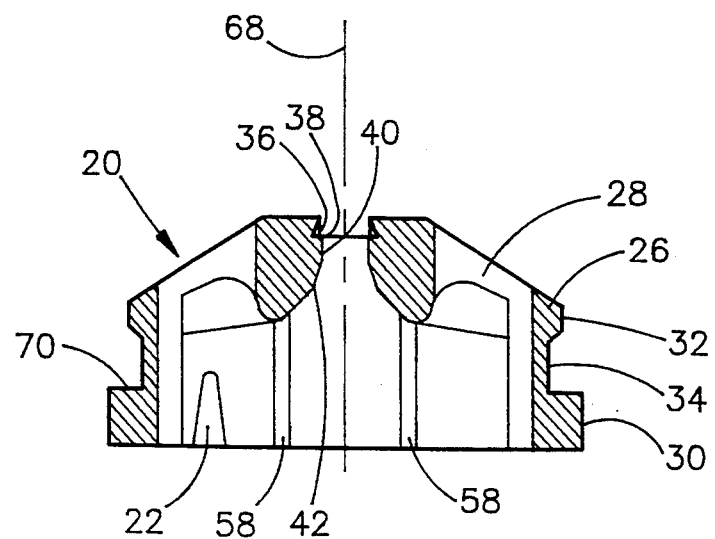
FIG. 6 is a cross-sectional view along section 6—6 of FIG. 4.

The edges of the gripper jaws 24, as depicted in FIG. 6, are designed with an indented edge 36. The gripper jaws 24 typically spread apart when non-metallic shielded cable is inserted along central axis 68 with the cable contacting the first angled surface 42 on the underside of the gripper support 29. Further insertion causes the second angled surface 40 to also come into contact with the cable. After the cable is inserted as far as desired, tension may be applied to the cable in the opposite direction, or away from the box. This action causes gripper edge 38 to bite into the cable and lock it in place. The bite or grip caused by gripper edge 38 of gripper jaws 24 is non-abrasive as a result of the resilient material of construction of connector 20, and does not tear, abrade, or puncture the shield of said cable. The cable is however securely locked inside the junction box by this action.

Figure 5:
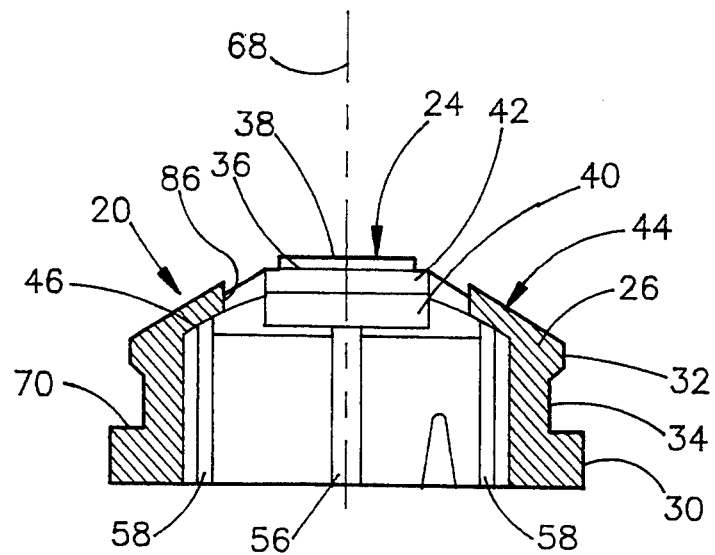
FIG. 5 is a cross-sectional view along section 5—5 of FIG. 4.

As depicted in FIG. 5, the centering jaws 44 have angled surface 46 interior of connector wall 26 and surface 86 parallel to central axis 68. In operation, as cable is pushed through connector 20, centering jaws 44 typically do not spread to allow the cable to pass. Centering jaws 44 function to provide centering of the cable, while not impeding its passage. This may be a rough centering action, depending on the gauge of the cable being inserted, as some gauges will not extend entirely from one centering jaw 44 to the other and in this case one centering jaw 44 acts to push the cable farther toward the central axis 68. The cable, whether circular or oval in cross sectional shape, does not have to be exactly centered in order for the invention to perform its task of locking the cable in place.

Figure 10:
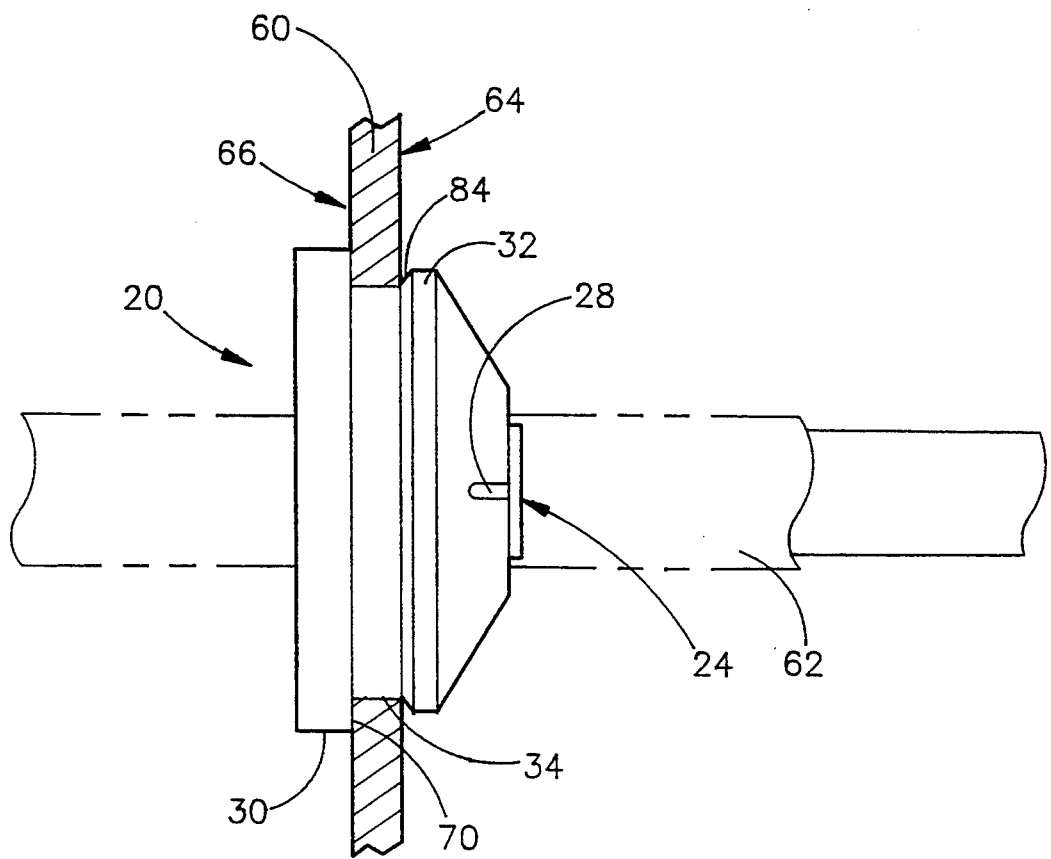
FIG. 10 is a side view showing the connector of this invention inserted through a hole or knock-out of a typical junction box with a non-metallic sheathed cable inserted through the connector.

The connector 20 is depicted fully installed in the knock-out of a typical junction box wall 60 in FIG. 10. A circular non-metallic sheathed cable 62 is depicted inserted through the connector 20. Connector 20 is typically inserted until base flange 30 contacts the junction box wall 60 at abutment edge 70. The seat 34 of connector 20 rests on the surrounding junction box wall 60. After insertion, abutment edge 70 is flush with the exterior surface 66 of the junction box wall 60 and top flange 32 with rounded lip 84 may or may not be contacting the interior surface 64 of the junction box wall 60, depending on the wall thickness of the box. The seat 34 is approximately the same diameter as the opening in the panel of the box and is of a width equal to or greater than the thickness of the panel.

The connector 20 is therefore adaptable to several different wall thicknesses and to several different gauges of non-metallic sheathed cable 62. Once tension is applied to non-metallic sheathed cable 62 in an attempt to pull it out of the box, base flange 30 may be pulled slightly away from exterior surface 66, but only as far as the rounded lip 84 of top flange 32. Reverse tension does not have to be applied to cable 62 to make the connector 20 secure in the junction box, but if reverse tension is ever applied to the cable, it will be positively restrained once rounded lip 84 contacts the interior surface 64 of the junction box. Therefore the cable 62 is essentially secure after insertion, and does not require reverse tension to be applied to make it so.

Figure 7:
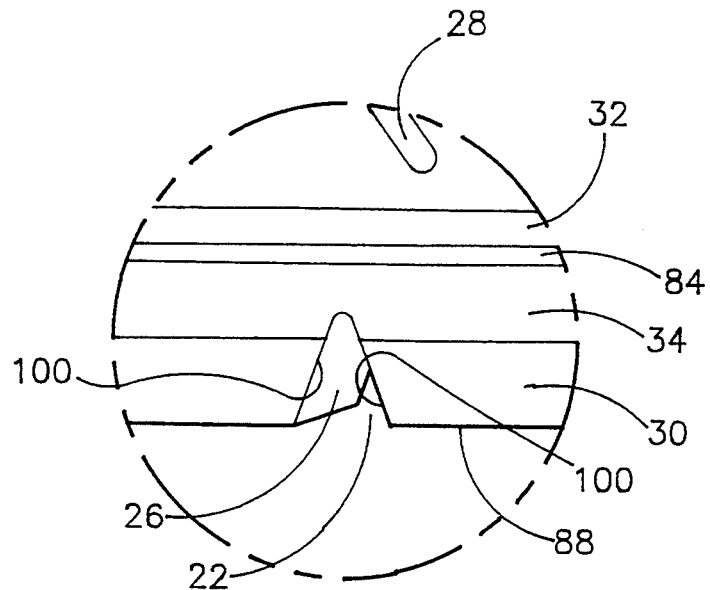
FIG. 7 is an enlarged view of a portion of FIG. 1, showing the notch.

As depicted in FIG. 7, notch 22 is cut completely through the wall of the connector and extends form the base 88 of the connector completely through base flange 30 and partially across seat 34. This provides a hinge 23 that is sized such that the proper flexibility is provided to the connector to allow it to collapse easily for insertion into the knock-out of a junction box.

Depicted in FIG. 5 are two jaw grooves 58 in the interior surface of connector wall 26 that define the jaws, both the gripper jaws 24 and centering jaws 44. A slot groove 56 also is depicted in connector wall 26 extending from slot 28. The grooves are cut into connector wall 26 to add desired flexibility to the connector while at the same time maintaining structural integrity of the connector 20.

The material of construction of the connector of this invention is of any suitable plastic material that provides appropriate resilient flexibility and dielectric properties to the connector. The preferred material is Texalon 600-A-ZIP-22 sold by Texapol Corporation, 177 Mikron Road, Bethlehem, Pa. 18017.

The dimensions cited in this description of the invention are typical dimensions for a connector designed to fit a typical 27/32 inch hole or knock-out of a junction box. This should not be construed as limiting the scope of this invention as the same principles can be applied to design this connector for any size hole or knock-out of a typical junction box.

The above description is given to satisfy the requirements for disclosure of the invention and are not to be construed as limiting the scope of the invention insofar as anyone skilled in the art can modify aspects of the disclosure. The scope of the invention may be limited only by the appended claims and their equivalents.

What is claimed is:

1. A one-piece C-shaped connector for connecting a sheathed electric cable through an opening in a panel, comprising:
    (a) a hollow one-piece C-shaped round body of resiliently flexible material having an outboard end, an inboard end, a wall and a passageway surrounded by said wall extending from said outboard end to said inboard end for enclosing a cable;
    (b) a cutout in said wall extending from said outboard end to said inboard end with sufficient width to permit said wall to be circumferentially collapsed sufficiently to permit the inboard end of said connector to be inserted in said opening in said panel;
    (c) at least two opposed gripper jaws at said inboard end of said body having an opening on each side thereof for gripping said cable;
    (d) an angled support having an inboard end and an outboard end for each of said gripper jaws with said gripper jaw integrally attached at said inboard end of said angled support;
    (e) a base flange having two arcuate parts with each arcuate part having a first facing end and a second facing end with said base flange located at said outboard end of said body and having a diameter greater than the diameter of said opening in the panel and with said cutout separating the said two arcuate parts between their first facing ends;
    (f) a notch separating said second facing ends of said two arcuate parts located on the opposite side of said body from said cutout extending entirely through said base flange;
    (g) a seat in said body of approximately the same diameter and an equal or greater width as the diameter and thickness, respectively, of the opening in the panel, said seat having an outward abutment edge located on the inner side of said base flange and an inboard side located across from such abutment edge;
    (h) a second flange located on said inboard side with said second flange being integrally attached to said seat; and
    (i) an integral hinge in said wall located between said notch and the nearest of said openings on a side of said gripper jaws and opposite said cutout whereby said body can be collapsed by folding about said hinge to close said cutout and decrease the diameter sufficiently to be inserted in the opening of said panel.

2. The one-piece C-shaped connector of claim 1 wherein said notch is V-shaped and extends inwardly partially into said seat.

3. The one-piece C-shaped connector of claim 2 wherein resiliently flexible material of said body has a diameter of approximately ⅞ inch.

4. The one-piece C-shaped connector of claim 2 wherein said cutout has sidewalls spaced close enough to prevent said body from over collapsing.

5. The one-piece C-shaped connector of claim 2 wherein said second flange contains a necked down area for increasing the ease of insertion of said connector in said opening of said panel.

* * * * *